United States Patent [19]

Wupper

[11] Patent Number: 4,753,131

[45] Date of Patent: Jun. 28, 1988

[54] SLIP-CONTROLLED BRAKE SYSTEM FOR ALL-WHEEL DRIVEN ROAD VEHICLES

[75] Inventor: Hans Wupper, Friedrichsdorf, Fed. Rep. of Germany

[73] Assignee: Alfred Teves GmbH, Frankfurt am Main, Fed. Rep. of Germany

[21] Appl. No.: 735,078

[22] Filed: May 16, 1985

[30] Foreign Application Priority Data

May 18, 1984 [DE] Fed. Rep. of Germany ....... 3418520

[51] Int. Cl.$^4$ ............................................. F16H 1/44
[52] U.S. Cl. ..................................... 74/710.5; 192/9
[58] Field of Search ................. 74/711, 710.5, 705, 74/665 GB; 303/100; 192/9, 0.082, 12 R, 13 R; 180/249, 248, 250, 197

[56] References Cited

U.S. PATENT DOCUMENTS

| | | | |
|---|---|---|---|
| 3,610,362 | 10/1971 | Toyama | 180/197 |
| 3,923,113 | 12/1975 | Pagdin | 74/711 X |
| 4,361,871 | 11/1982 | Miller et al. | 180/197 X |
| 4,467,886 | 8/1984 | DeClaire et al. | 74/711 X |
| 4,482,192 | 11/1984 | Leiber | 303/100 |
| 4,538,700 | 9/1985 | Suzuki | 180/249 X |
| 4,545,240 | 10/1985 | Leiber | 303/100 X |
| 4,549,163 | 10/1985 | Satoh et al. | 180/197 X |
| 4,552,241 | 11/1985 | Suzuki | 180/249 |
| 4,570,509 | 2/1986 | Nighswonger | 74/710.5 |

FOREIGN PATENT DOCUMENTS

| | | |
|---|---|---|
| 0106112 | 9/1983 | European Pat. Off. . |
| 0128436 | 12/1984 | European Pat. Off. . |
| 1026180 | 3/1958 | Fed. Rep. of Germany . |
| 1180637 | 10/1964 | Fed. Rep. of Germany . |
| 3209071 | 9/1983 | Fed. Rep. of Germany . |
| 143170 | 7/1985 | Japan . |
| 8102049 | 7/1981 | PCT Int'l Appl. .................. 74/711 |
| 81/02188 | 8/1981 | PCT Int'l Appl. . |
| 952861 | 3/1964 | United Kingdom . |
| 1411283 | 10/1975 | United Kingdom . |
| 2057611 | 4/1981 | United Kingdom . |
| 544571 | 2/1977 | U.S.S.R. ............................ 180/197 |

Primary Examiner—Leslie A. Braun
Assistant Examiner—David Novais
Attorney, Agent, or Firm—James B. Raden; Robert P. Seitter

[57] ABSTRACT

In a slip-controlled system for road vehicles with all-wheel drive, the rear-axle differential gear (5) and/or the intermediate differential (3) are equipped with differential locks (33, 34). An electronic brake slip control unit (50) automatically disengages the differential locks (33, 34) partially or entirely upon the occurrence of an imminent locked condition or upon commencement of brake slip control. Coupling devices are provided as differential locks (33, 34) which allow coupling of the output shafts (8, 11; 9, 10) and which are isolated electrically or hydraulically in the control phase.

5 Claims, 1 Drawing Sheet

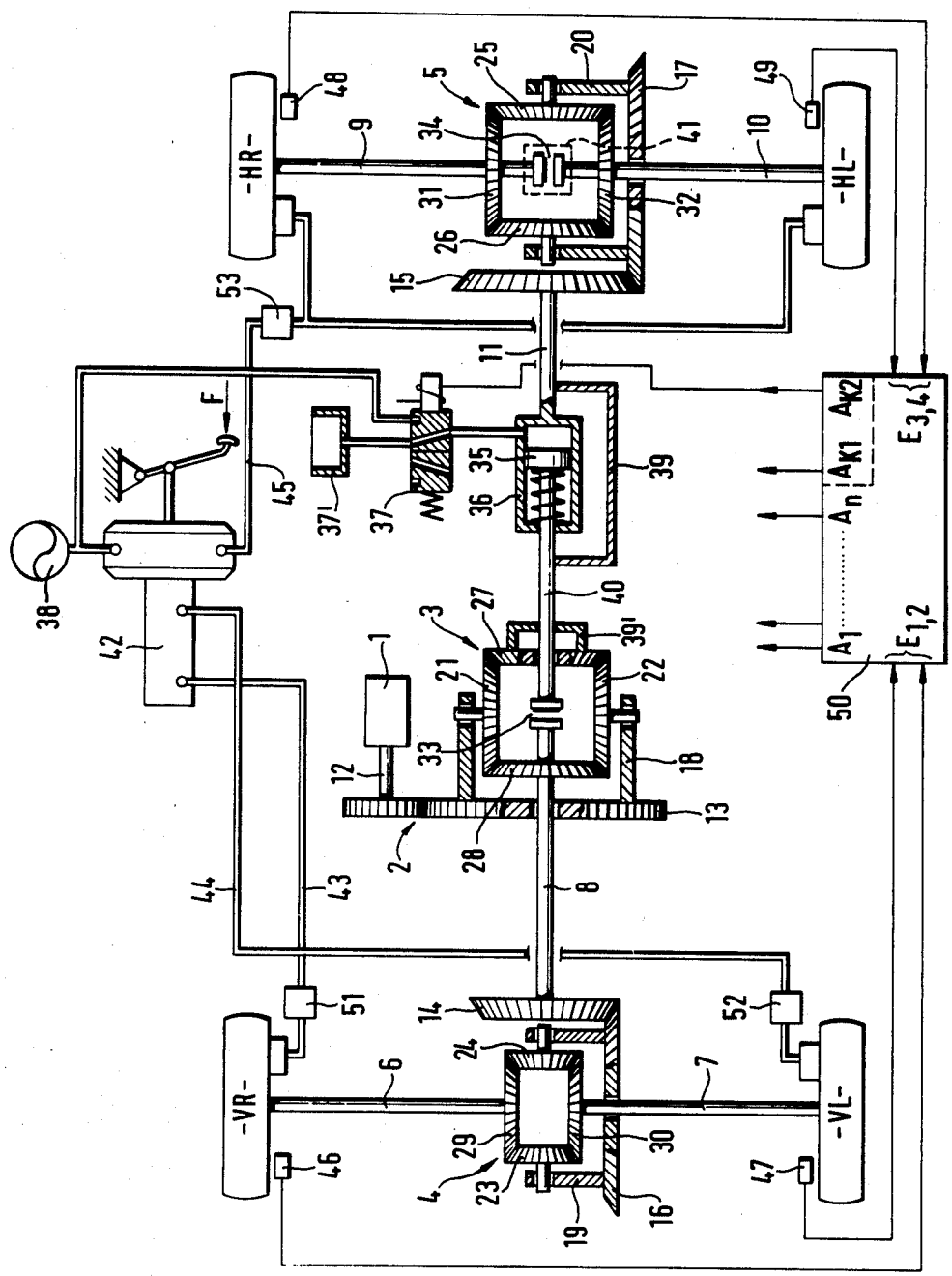

SLIP-CONTROLLED BRAKE SYSTEM FOR ALL-WHEEL DRIVEN ROAD VEHICLES

BACKGROUND OF THE INVENTION

The present invention relates to a slip-controlled brake system for road vehicles with all-wheel drive. In order to compensate the differences in distances the separate wheels have to cover, these all-wheel drive vehicles are equipped with differential gears or so-called differentials. The compensating effect of the differentials being adapted to be neutralized or reduced by virtue of differential locks which operatively or positively couple the output shafts.

Known vehicles with all-wheel drive are equipped with both a front-axle differential and a rear-axle differential, as well as with an intermediate differential which interconnects the front-axle drive and the rear-axle drive. To improve the driving behavior and force transmission in the event of unfavorable road conditions, in particular on ice and snow or if the road is slippery on one side thereof, it is known to mount locks into the intermediate and the rear-wheel differential which permit to partial or complete neutralization of the compensating effect by coupling of the output shafts. As a general rule, the front-axle differential does not include such a lock because this would excessively impair steerability.

In vehicles with slip control, however, the rigid coupling of the driven wheels and axles will cause difficulties after the differential locks are put into operation. This is because the control unit which (in consideration of the wheel rotation and the changes thereof) determines the necessary further braking pressure variation for the purpose of accomplishing an optimal braking and driving behavior, is not able to distinguish between the torque variations transmitted by the rigid coupling and those torque variations resulting from the control of the brake force and the friction force between the tire and road. For this reason, it has been necessary to deactivate brake slip control when engaging the differential locks, this bearing the disadvantage that, especially in the event of unfavorable road or weather conditions when the differential locks are useful, one had to do without brake slip control. This is a disadvantage because slip control could accentuate its special advantages on snow and slippery roads, in the presence of different friction values on the right/left side and the like, and could preserve in particular steerability and the driving stability of the vehicle.

It is therefore the object of the present invention to overcome the shortcomings of the prior art and to develop a slip-controlled brake system which is particularly suitable for road vehicles with all-wheel drive.

SUMMARY OF THE INVENTION

This object is achieved by arranging for the differential locks to be automatically disengageable partially or entirely upon the occurrence of an imminent locked condition and/or upon commencement of brake slip control in a brake system of the type referred to.

According to one embodiment of the present invention, the brake system comprises an electronic brake slip control unit which is supplied with data relating the rotational behavior of the vehicle wheels and which, by logic combining and signal processing, generates control signals which, during control action, will keep the braking pressure constant, will reduce it and, if necessary, re-increase it by actuation of braking pressure modulators, and which unit serves to partially or entirely disengage the differential locks at least until termination of the braking action with slip control.

Thus, the inventive improvement of the brake system permits slip control can be put into operation in every situation. Thus, locking of the vehicle wheels is prevented, and it is ensured that driving stability and steerability of the vehicle will be maintained even in unfavorable situations. Further features, advantages and applications of the present invention can be gathered from the following description of further details as well as from the depiction of an embodiment with reference to the accompanying drawing.

BRIEF DESCRIPTION OF THE DRAWING

In the drawing the single FIGURE provides a schematically simplified illustration of the distribution and the transmission path of the driving torques of an automotive vehicle with all-wheel drive, including the arrangement of the differential gears and is illustrated in conjunction with the basic hydraulic and electric circuit diagram of a slip-controlled brake system in accordance with the present invention.

DETAILED DESCRIPTION OF THE DRAWING

The vehicle shown in the drawing comprises a drive unit 1, the torque of which is transmitted by way of a transmission gear 2 onto an intermediate differential 3 and from this by way of a front-axle differential 4 and a rear-axle differential 5 onto the vehicle wheels VR, VL, HR, HL.

The differential gears or, respectively, differentials 3, 4, 5 are alike in their principal design, apart from the fact that the rear-axle and the front-axle differential 5 and 4, respectively, are designed as miter gears with a rectangular allocation of the driving shafts 11, 8 in relation to the output shafts 9, 10; 6,7, while in respect of the intermediate differential 3, the output shafts (the driving shafts 8, 11 leading to the axle differentials 4 and 5) extend in parallel to the axis of rotation 12 of the drive 1.

The differential gears 3, 4, 5 are composed substantially of a drive wheel gear 13 or, respectively, a bevel drive gear 14, 15 being connected to a housing 18, 19, 20 either directly, this is true with the intermediate differential 3 or by way of a large bevel wheel 16, 17, in which housing the two compensation wheels 21, 22; 23, 24; 25, 26 of the differentials are rotatably supported. During standstill of the compensating wheels, the rotation of the housings 18, 19, 20 will be transmitted by way of the associated bevel wheels 27, 28; 29, 30; 31, 32 onto the output shafts 8, 11 or, respectively, onto the semiaxes 6, 7 and 9, 10 of the driven vehicle wheels HR, HL; VR, VL. At different speeds of the output shafts 8, 11 or of the vehicle wheels or, respectively, the semiaxes 6, 7; 9, 10, for instance due to the wheels on the right/left side having to cover different distances when cornering, the compensating wheels 21, 22; 23, 24; 25, 26 will start to rotate, and compensation will be brought about thereby.

The intermediate differential 3 and the rear-axle differential 5 are equipped with differential locks 33, 34 which herein are substantially composed of a clutch providing rigid coupling between the output shafts 8, 11; 9, 10. If operatively connected clutches admitting a certain slip are deployed, the arrangement of the differential locks 33, 34 will only reduce the compensating effect of the gears. In the event of a positively connected clutch, however, the compensating effect will be neutralized completely.

To actuate the clutch which serves as differential lock 22 of the intermediate gear 3, there is provision of a hydraulically actuated piston 35 placed in an operating cylinder 36. When in its inactive position illustrated, the said piston 35 will separate by spring force the clutch parts intermeshing in the operating position and will thus disengage the differential lock 33. By introduction of hydraulic pressure with the aid of a three-way/two-position directional control valve 37 closed in its inactive position, the piston 35 will be displaced to the left (as viewed in the drawing) whereby the clutch of the lock 33 will be coupled. A like hydraulic actuating device is advisable if as in the embodiment illustrated a brake system with hydraulic energy supply, symbolized by the accumulator 38, is already provided. If a slip-controlled brake system is dealt with wherein pressure will be supplied to some or all of the brake circuits upon commencement of control, the same valve, the so-termed main valve, allows to build pressure in the operating cylinder 36; in this case, said main valve will perform the function of the valve 37 in addition.

In the inactive position of the piston 35, the right working chamber in the operating cylinder 36 is connected to a pressure supply reservoir 37'.

It will be ensured by the indicated frames 39, 39' that although there is permitted axial displacement of the part 40 of the output shaft 11 which is in engagement with the clutch of the lock 33, the tongue will be transmitted from part 40 onto the shaft 11 in an unreduced fashion.

A hydraulic actuating device of like design could be utilized for the clutch of the differential lock 34 of the gear-axle differential 5. The dotted frame 41 in the drawing symbolizes an engageable and disengageable differential lock which can be realized in manifold ways. For example, a viscosity clutch with little slip (Ferguso principle) could be mounted and the coupling thereof can be controlled by removing or adding hydraulic fluid.

In the embodiment described, the brake system consists of a pedal-actuated three-circuit braking pressure generator 42 with hydraulic energy supply and with a hydraulic accumulator 38. The pedal force is symbolized by F. The two front wheels VR, VL are in hydraulic communication with separate brake circuits 43 or 44, respectively, while the rear wheels are connected jointly to the third brake circuit 45.

In this arrangement, the rotational behavior will be determined with wheel rotational behavior sensors 46 to 49 which deliver corresponding information in the form of electric signals to a slip control unit or to an electric circuit 50, respectively. The information introduced at the inlets $E_1$ to $E_4$ will be logically combined there, and output signals $A_1$ to $A_n$ will be generated which allow control of the brake slip in a known manner. For example, by means of braking pressure modulators 51 to 53 which may be realized by electromagnetically actuatable multi-directional control valves as soon as the logic in the circuit 50 recognizes from the sensor signals that there is an imminent locked condition at one or at more of the wheels.

The circuit 50 herein contains in addition the necessary components for the control of the differential locks or the clutches 33, 34, respectively. This is represented by the dotted separation of the two outlets $A_{K1}$ and $A_{K2}$ which supply the signals to actuate the differential locks 33 and 34. Upon commencement of brake slip control or upon recognition of a locked condition, it is ensured by corresponding logic combining inside the circuit 50 that the clutches 33, 34 are disengaged, which can be attained in the case of the intermediate differential 3 by switching the three-way/two-position valve 37 back into its inactive position shown.

If likewise the front-wheel differential 4 is equipped with a lock in special cases, which one generally refrains from because of steerability being impaired as a result, it could be ensured (analogously to the control of the clutches 33 and 34) that this lock also is disengaged or will be disengaged upon response of brake slip control.

Depending on which embodiment of the present invention is utilized the differential locks will be engaged again upon termination of the braking action with slip control, or these locks will remain disengaged until the driver or an automatic gearbox deactivates the compensating effect of the differentials 3, 4 again by coupling of the output shafts.

What is claimed is:

1. A slip-controlled brake system for road vehicles with all-wheel drive which, in order to compensate for differences in turning radii which the separate wheels have to cover, is equipped with differential gears, the compensating effect of said differential gears being adapted to be disabled by virtue of differential locks operatively coupled to output shafts of the vehicle, slip control means for controlling the braking of the vehicle upon the occurrence of an imminent locked condition, and wherein said system includes means for automatically disengaging the differential locks (33, 34) partially or entirely when the slip control means detects the occurrence of an imminent locked condition and/or upon commencement of brake slip control.

2. A slip-controlled brake system for road vehicles with all-wheel drive which, in order to compensate for differences in turning radii which the separate wheels have to cover, is equipped with differential gears, the compensating effect of said differential gears being adapted to be disabled by virtue of differential locks operatively coupled to output shafts of the vehicle, wherein said system includes means for automatically disengaging the differential locks (33, 34) partially or entirely upon the occurrence of an imminent locked condition and/or upon commencement of brake slip control, an electronic brake slip control unit (50) which is supplied with data indicative of rotational behavior of the vehicle wheels (VR, VL, HR, HL) and which generates control signals which, during control action, will keep braking pressure constant, will reduce it and reincrease it by actuation of braking pressure modulators (51, 52, 53), and which control unit further serves to partially or entirely disengage the differential locks (33, 34) at least until termination of the braking action with slip control.

3. A brake system as claimed in claim 1, wherein said brake system comprises a braking pressure generator (42) with a control chamber in which a pressure rise takes place upon commencement of brake slip control which directly actuates the differential locks (33, 34).

4. A brake system as claimed in claim 1, wherein said brake system is provided for vehicles having hydraulic clutches in the form of differential locks (33, 34) from which fluid can be removed upon commencement of brake slip control.

5. A brake system as claimed in claim 1, wherein said brake system is provided for vehicles which include one lockable differential gear between a front-axle and a rear-axle drive and between the rear wheels, and wherein all differential locks (33, 34) are disengageable simultaneously upon commencement of brake slip control.

* * * * *